United States Patent
Kadosh et al.

(10) Patent No.: US 9,210,998 B2
(45) Date of Patent: Dec. 15, 2015

(54) TABLE SYSTEM FOR SERVING AND DISPLAYING FOOD AND BEVERAGES

(76) Inventors: Yariv Kadosh, Tel Aviv (IL); Mordechai Ben Aharom, Moshar Olesh (IL); Ran Ben Dori, Hod-Hasharon (IL); Amit Kaufman, Borgata (IL)

( * ) Notice: Subject to any disclaimer, the term of this patent is extended or adjusted under 35 U.S.C. 154(b) by 97 days.

(21) Appl. No.: 13/481,846

(22) Filed: May 27, 2012

(65) Prior Publication Data

US 2012/0304899 A1 Dec. 6, 2012

(30) Foreign Application Priority Data

Jun. 1, 2011 (IL) .......................................... 213296

(51) Int. Cl.
| | |
|---|---|
| *A47B 13/10* | (2006.01) |
| *A47B 13/08* | (2006.01) |
| *A47B 47/05* | (2006.01) |
| *A47B 87/02* | (2006.01) |
| *F16B 5/06* | (2006.01) |

(52) U.S. Cl.
CPC ............... *A47B 13/088* (2013.01); *A47B 47/05* (2013.01); *A47B 87/0215* (2013.01); *F16B 5/065* (2013.01); *Y10T 403/56* (2015.01)

(58) Field of Classification Search
CPC .................. Y10T 24/44017; Y10T 24/44034; Y10T 24/4406; Y10T 24/31; Y10T 24/4727; A47B 87/002; A47B 87/0207; A47B 87/0223; A47B 13/10; A47B 47/00; A47F 5/0062; A47F 5/00
USPC .............. 108/65, 66, 91–93, 101, 153.1, 156, 108/157.13, 159, 158, 158.11, 64; 160/327, 160/328, 368.1, 402; 211/186–190, 103, 211/207, 85.4; 403/184, 180, 182, 258, 343
See application file for complete search history.

(56) References Cited

U.S. PATENT DOCUMENTS

| | | | | |
|---|---|---|---|---|
| 606,967 | A | * | 7/1898 | Hanger ............................ 108/31 |
| 612,166 | A | * | 10/1898 | Lefort ............................ 160/327 |
| 884,848 | A | * | 4/1908 | Page ............................. 108/101 |
| 899,267 | A | * | 9/1908 | Sheehen ......................... 108/66 |
| 1,045,709 | A | * | 11/1912 | Kornicker et al. ............. 160/402 |
| 1,099,034 | A | * | 6/1914 | Girard .......................... 160/402 |
| 1,145,205 | A | * | 7/1915 | Mills ............................ 108/101 |
| 1,627,652 | A | * | 5/1927 | Kornicker et al. ............. 248/158 |
| 2,780,081 | A | * | 2/1957 | Alexander ..................... 141/341 |
| 3,027,210 | A | * | 3/1962 | Eames et al. ...................... 312/6 |
| 3,267,881 | A | * | 8/1966 | Saggione ........................ 108/59 |
| 3,291,079 | A | * | 12/1966 | Ruda ............................ 108/156 |
| 3,684,285 | A | * | 8/1972 | Kane ............................ 273/241 |
| 3,734,033 | A | * | 5/1973 | Downing ....................... 108/190 |
| 3,835,527 | A | * | 9/1974 | Cornair ........................... 29/560 |
| 4,099,472 | A | * | 7/1978 | Kellogg ........................ 108/185 |
| 4,318,576 | A | * | 3/1982 | Ford ............................. 312/264 |
| 4,447,096 | A | * | 5/1984 | Perl et al. ...................... 312/111 |
| 4,474,416 | A | * | 10/1984 | Rogahn ....................... 312/265.2 |
| D282,323 | S | * | 1/1986 | Fetty ............................. D7/601 |
| 5,343,816 | A | * | 9/1994 | Sideris ........................... 108/94 |
| 5,577,466 | A | * | 11/1996 | Luxford ........................ 119/706 |
| 5,752,297 | A | * | 5/1998 | Ramey ........................... 24/462 |
| 5,826,880 | A | * | 10/1998 | Cooper ......................... 273/261 |
| 6,038,984 | A | * | 3/2000 | Freitag .......................... 108/44 |

(Continued)

*Primary Examiner* — Janet M Wilkens

(57) ABSTRACT

A ring-shaped serving table, with a non-perfect round space in the center, that is made up of two identical or similar half-ring shaped plates that may be joined together in two ways: to create a ring-shaped table and to create an S-shaped table.

2 Claims, 20 Drawing Sheets

(56) References Cited

U.S. PATENT DOCUMENTS

| | | | | |
|---|---|---|---|---|
| 6,123,035 | A * | 9/2000 | Pfister | 108/180 |
| 6,382,109 | B1 * | 5/2002 | Novikoff | 108/65 |
| 6,470,811 | B1 * | 10/2002 | Isinger | 108/153.1 |
| 6,615,747 | B2 * | 9/2003 | Stenftenagel et al. | 108/159 |
| 6,629,506 | B2 * | 10/2003 | Park | 108/156 |
| 6,659,159 | B2 * | 12/2003 | Fritsche et al. | 160/371 |
| 6,688,239 | B1 * | 2/2004 | Pettini et al. | 108/50.11 |
| 7,249,741 | B1 * | 7/2007 | Larson | 248/188.1 |
| 2002/0040668 | A1 * | 4/2002 | Pang Chan et al. | 108/157.1 |
| 2002/0189504 | A1 * | 12/2002 | Johnson | 108/50.01 |
| 2003/0075083 | A1 * | 4/2003 | Devey | 108/92 |
| 2010/0035738 | A1 * | 2/2010 | Smith, Jr. | 483/3 |
| 2012/0273139 | A1 * | 11/2012 | Morales | 160/87 |

* cited by examiner

TABLE SYSTEM FOR SERVING AND DISPLAYING FOOD AND BEVERAGES

TECHNICAL FIELD

The present invention refers to a table for serving and displaying food and beverages.

BACKGROUND ART

It is customary, on many occasions, such as wedding receptions, conferences and conventions, events held at hotels, etc. to serve food and beverages and to do so using buffet tables from which the guests may serve themselves. Buffet tables commonly used today to serve food and beverages at events are relatively cumbersome, and the present invention refers to serving tables that offer an effective solution to existing problems.

DESCRIPTION OF THE DRAWINGS

The intention of the drawings attached to the application is not to limit the scope of the invention and its application.

The drawings are intended only to illustrate the invention and they constitute only one of its many possible implementations.

THE INVENTION

Figure 1:
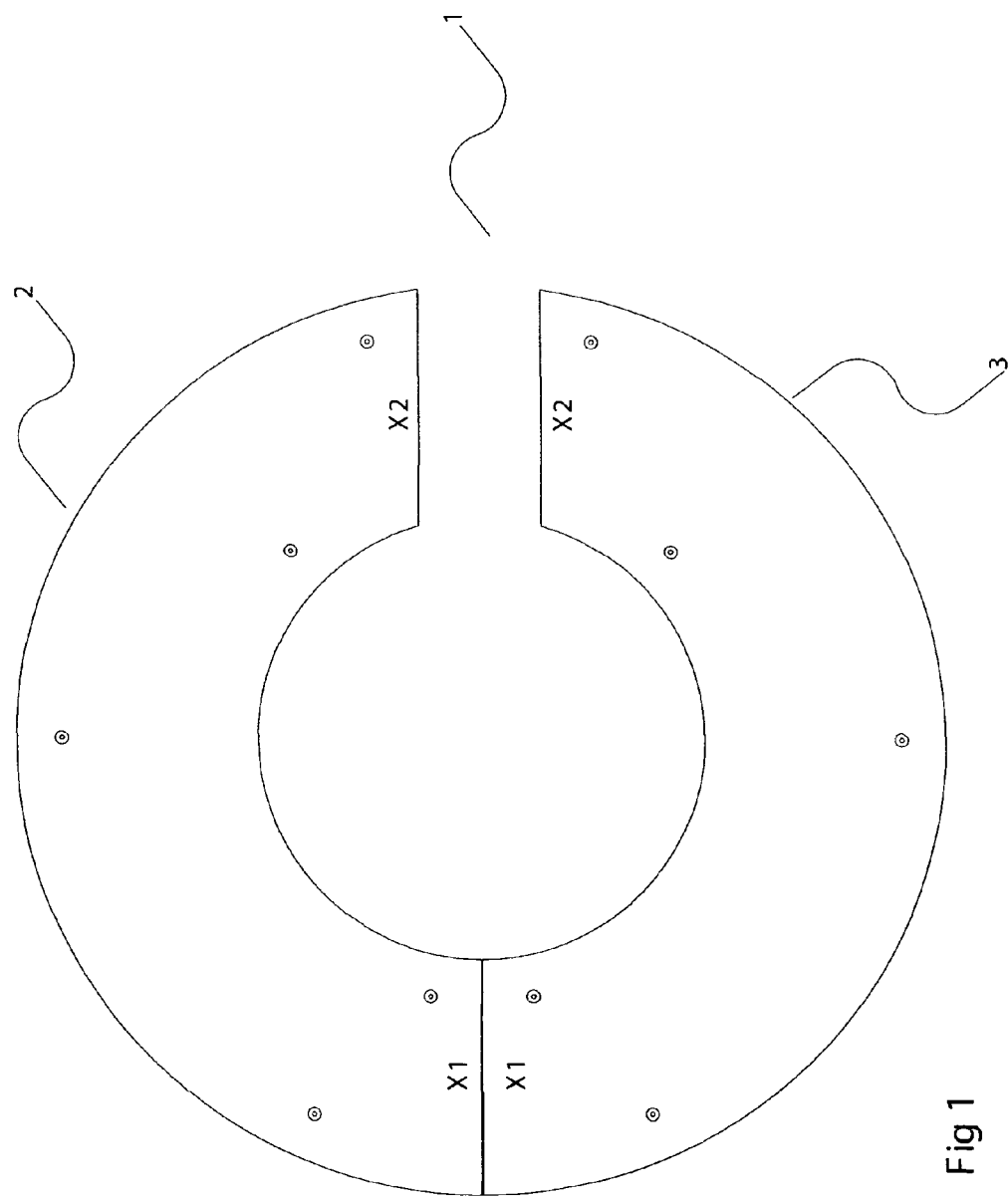
FIG. 1 depicts a ring-shaped serving table (1).
Figure 2:
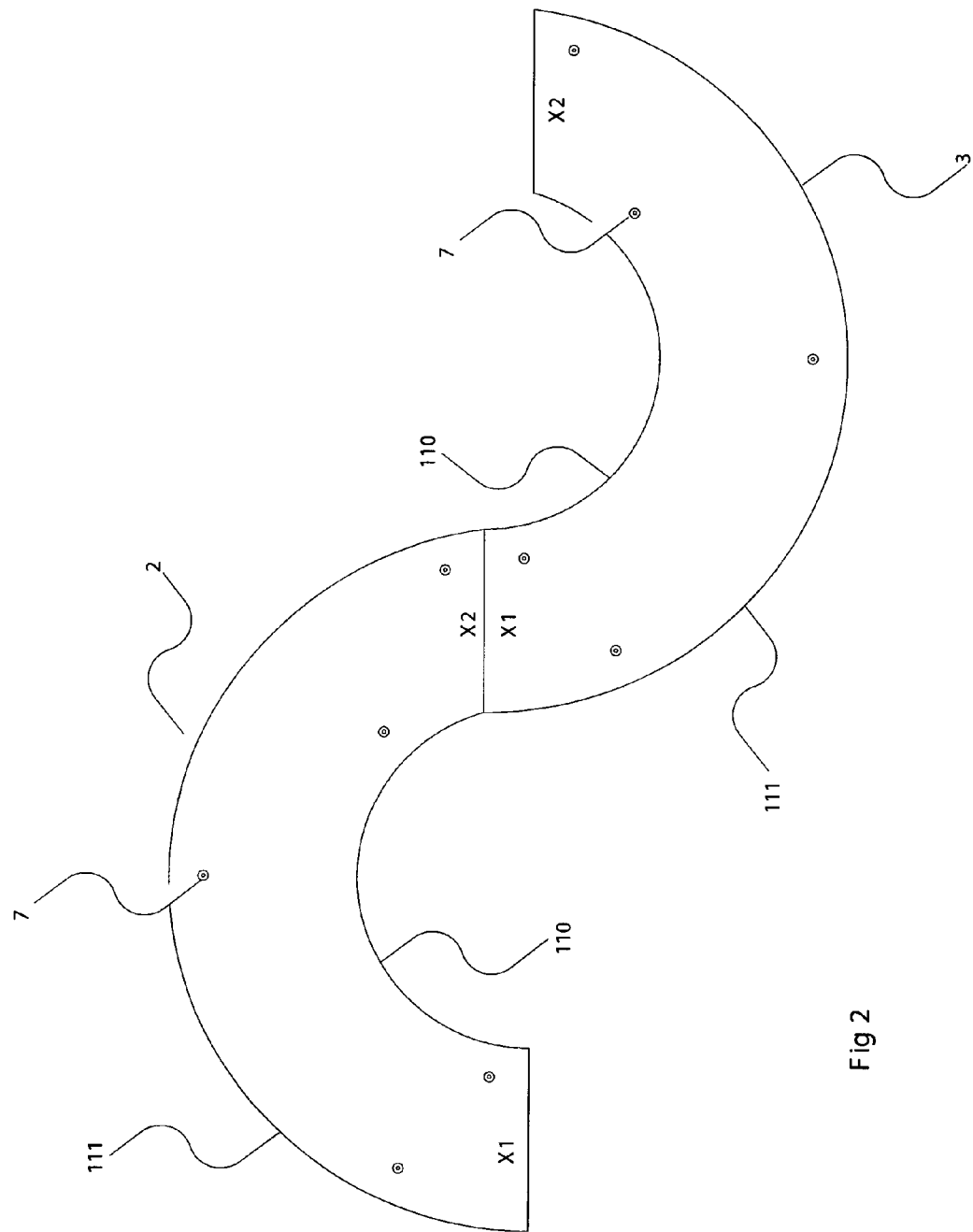
FIG. 2 depicts an S-shaped serving table (1).
Figure 3:
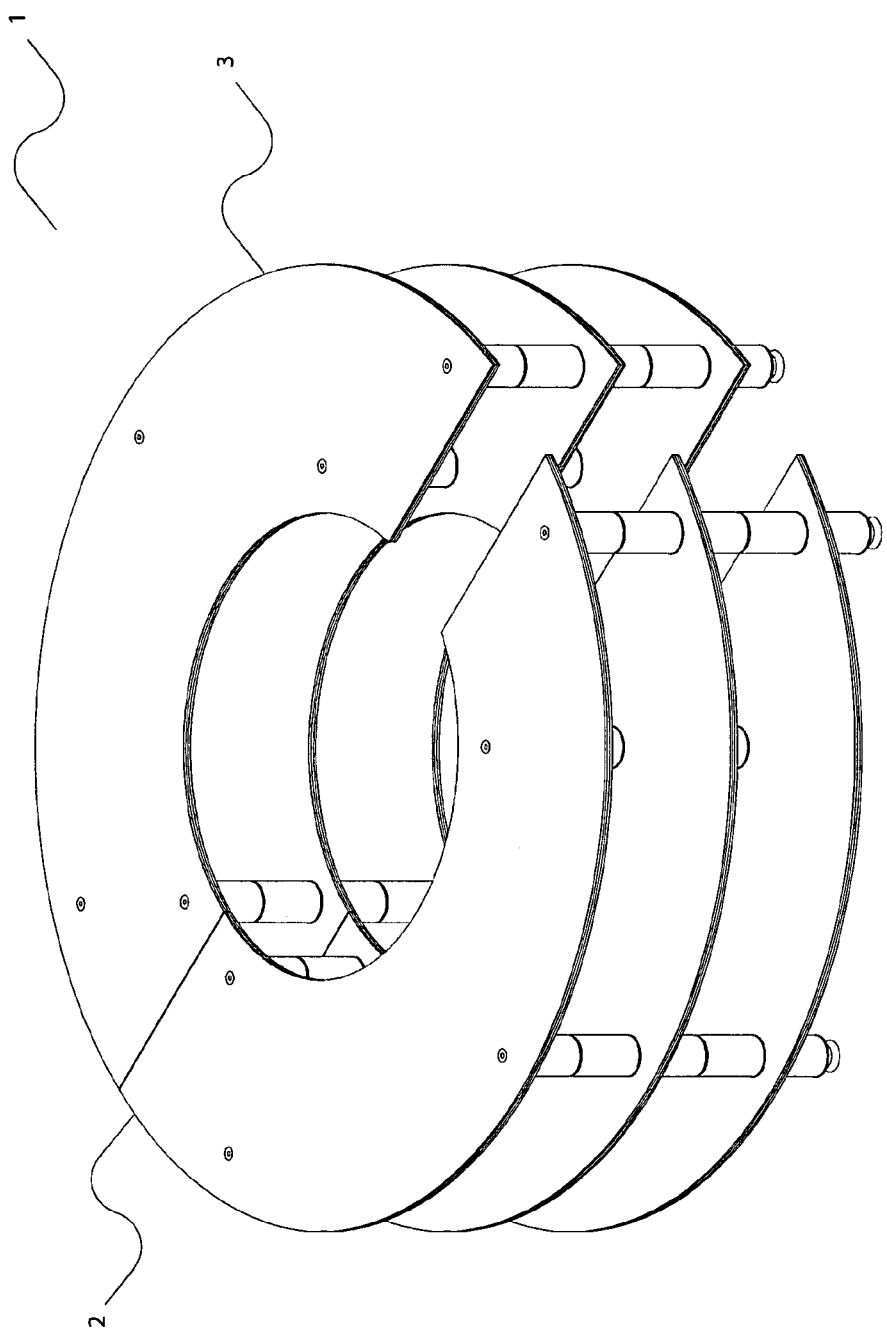
FIG. 3 depicts a three-tier ring-shaped serving table (1).
Figure 4:
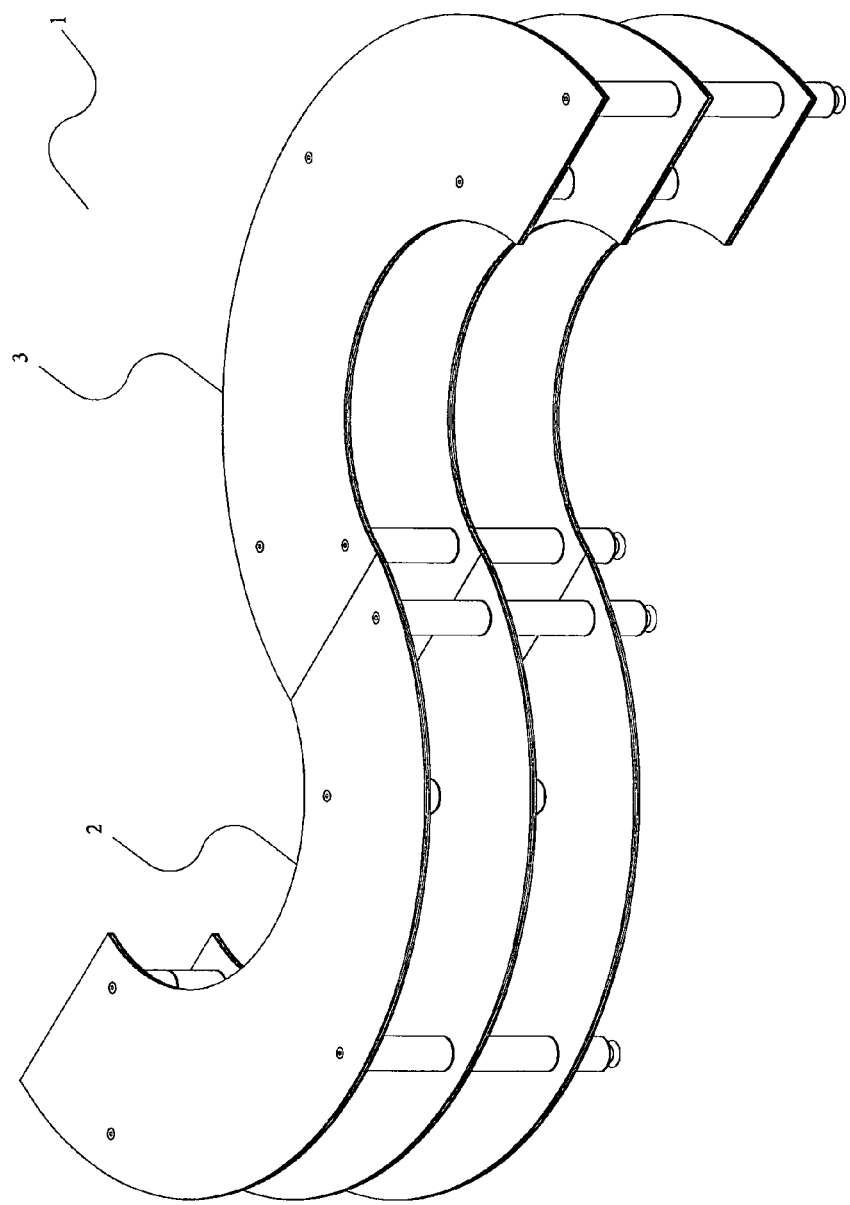
FIG. 4 depicts a three-tier S-shaped serving table (1).
Figure 5:
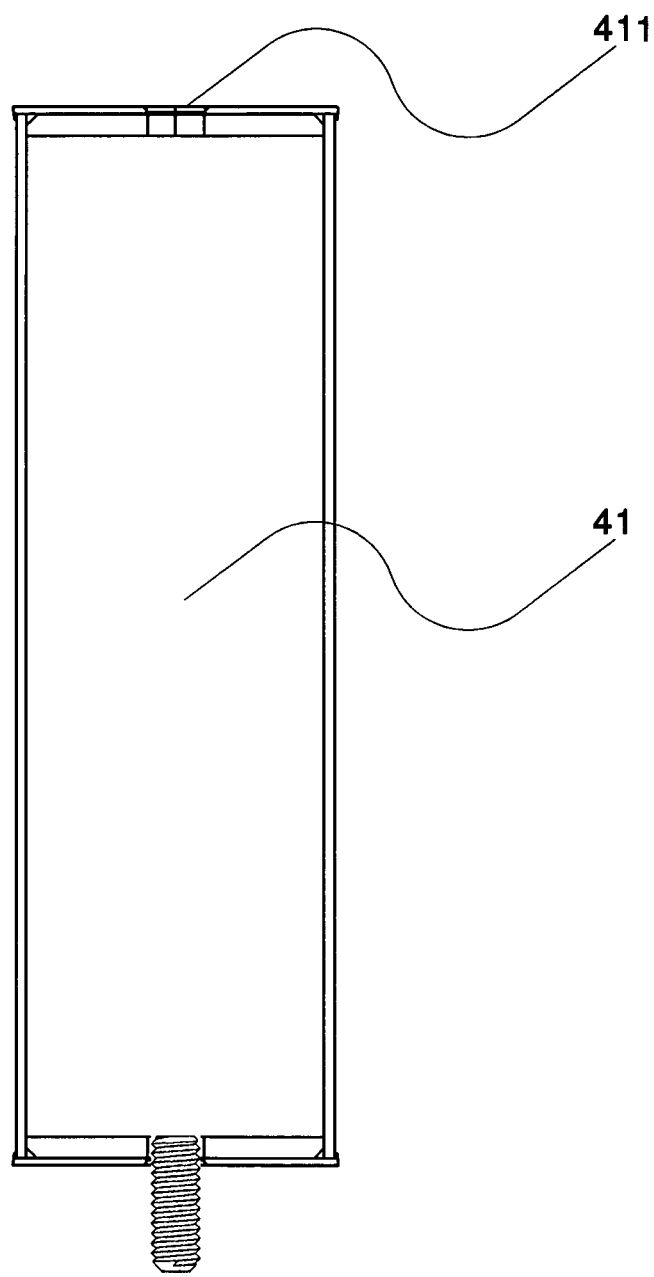
FIG. 5 presents a cross-section of the leg (41).
Figure 6:
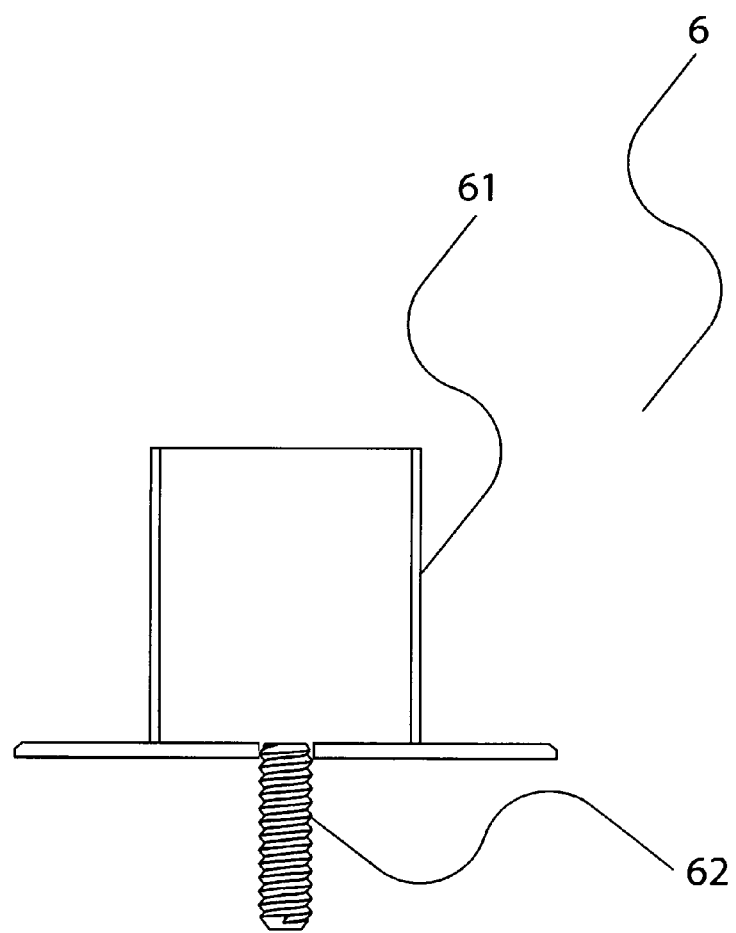
FIG. 6 presents a cross-section of the attaching system (6).
Figure 7:
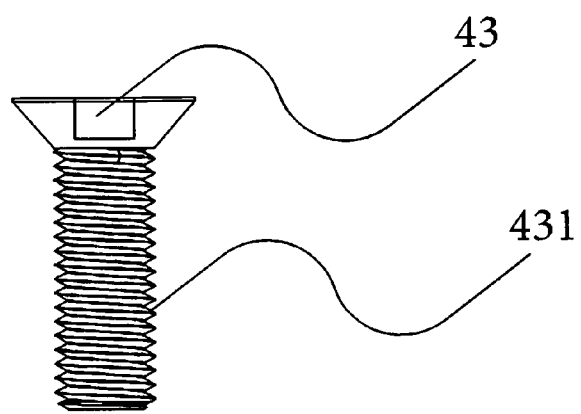
FIG. 7 presents a cross-section of the top screw (43).
Figure 8:
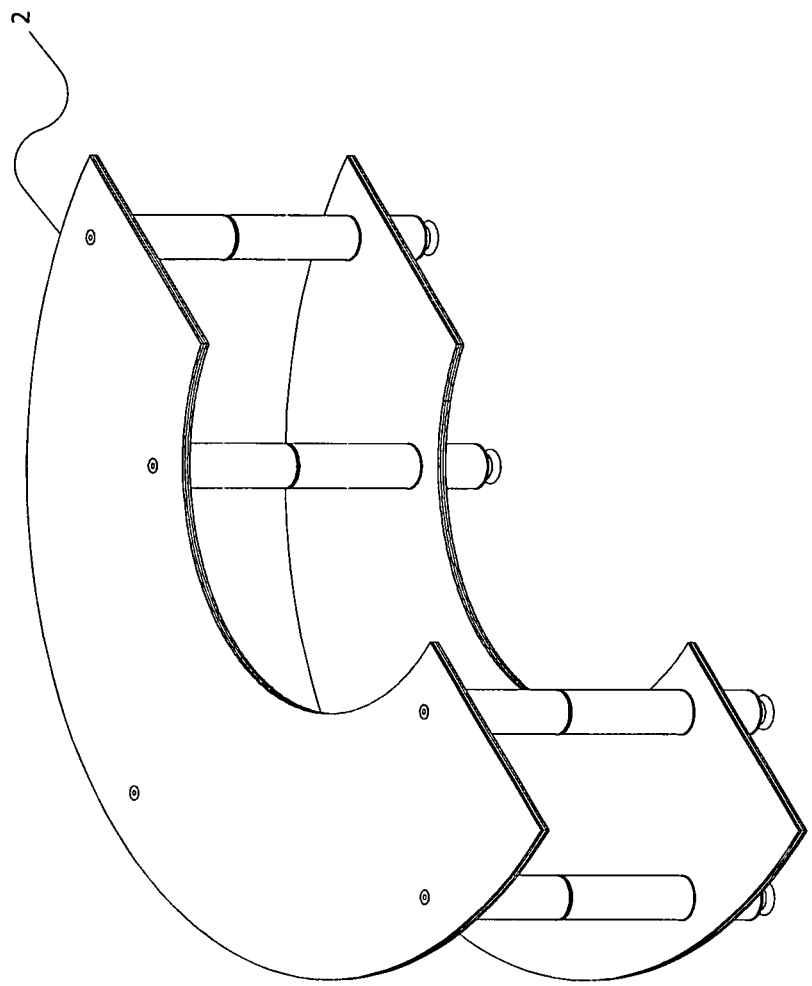
FIG. 8 depicts half of a two-tier ring-shaped table (1).
Figure 9:
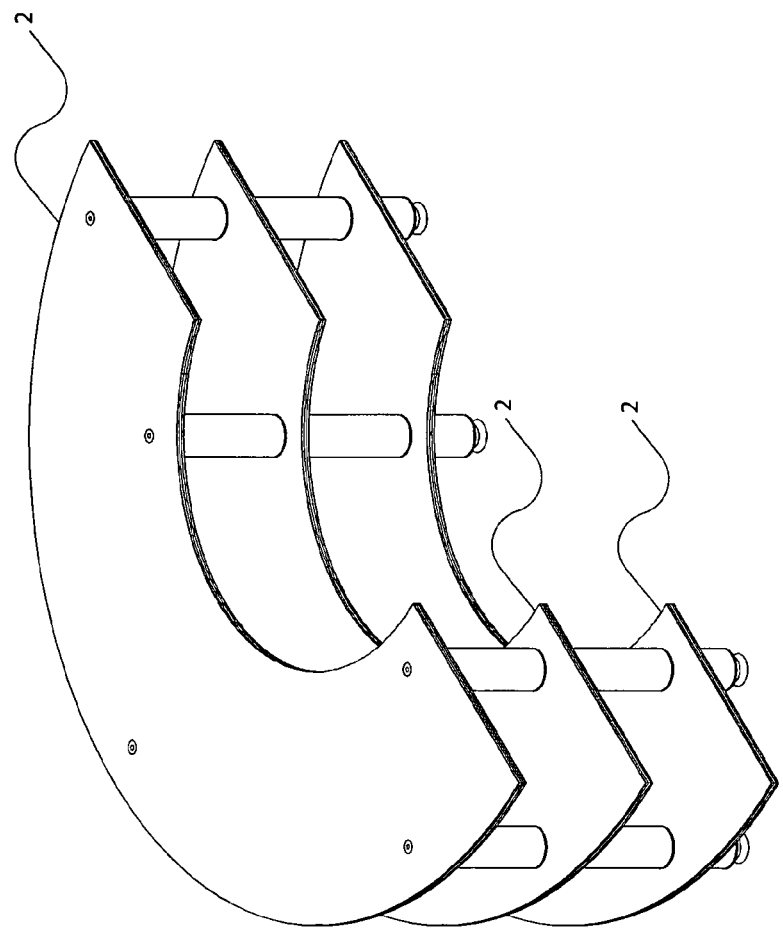
FIG. 9 depicts half of a three-tier ring-shaped table (1).
Figure 10:
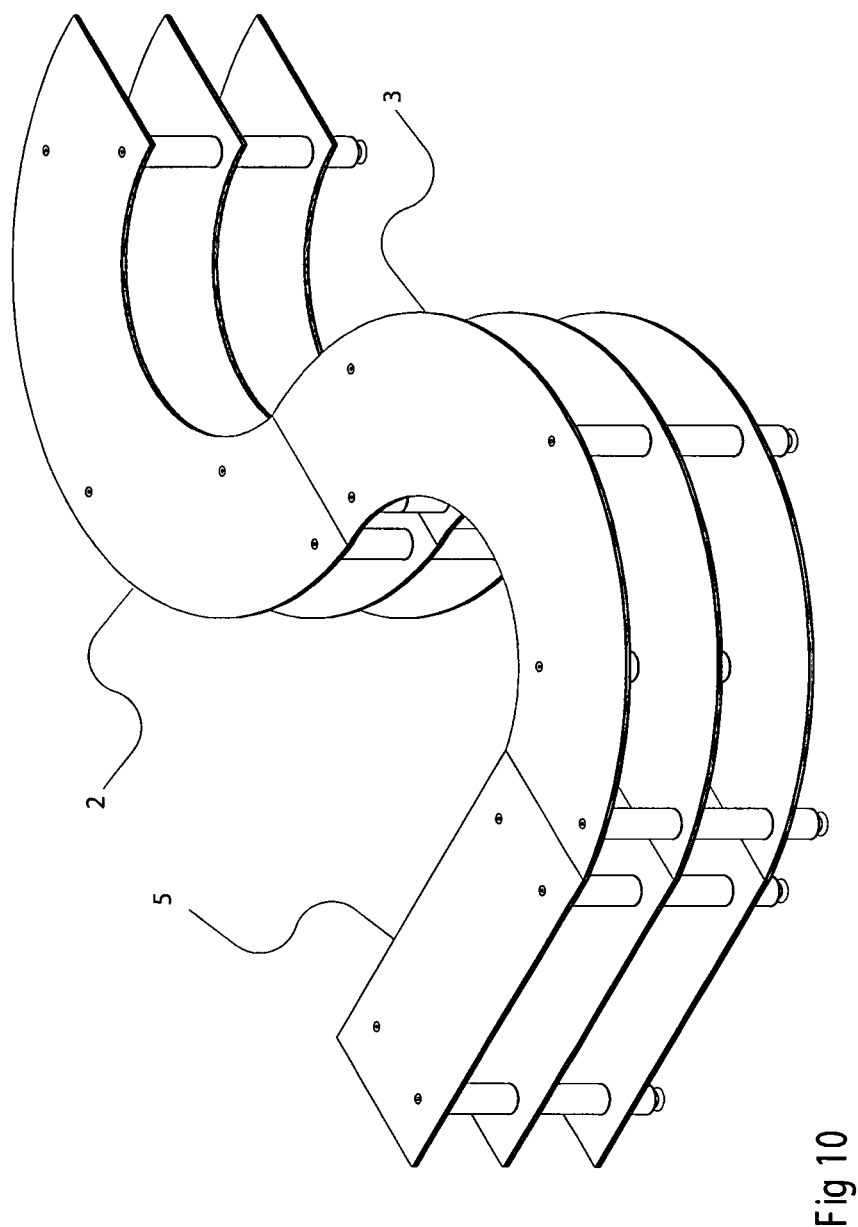
FIGS. 10 and 11 depict combinations involving two halves of a three-tier S-shaped serving table (1) and a three-tier rectangular extension table (5).
Figure 11:
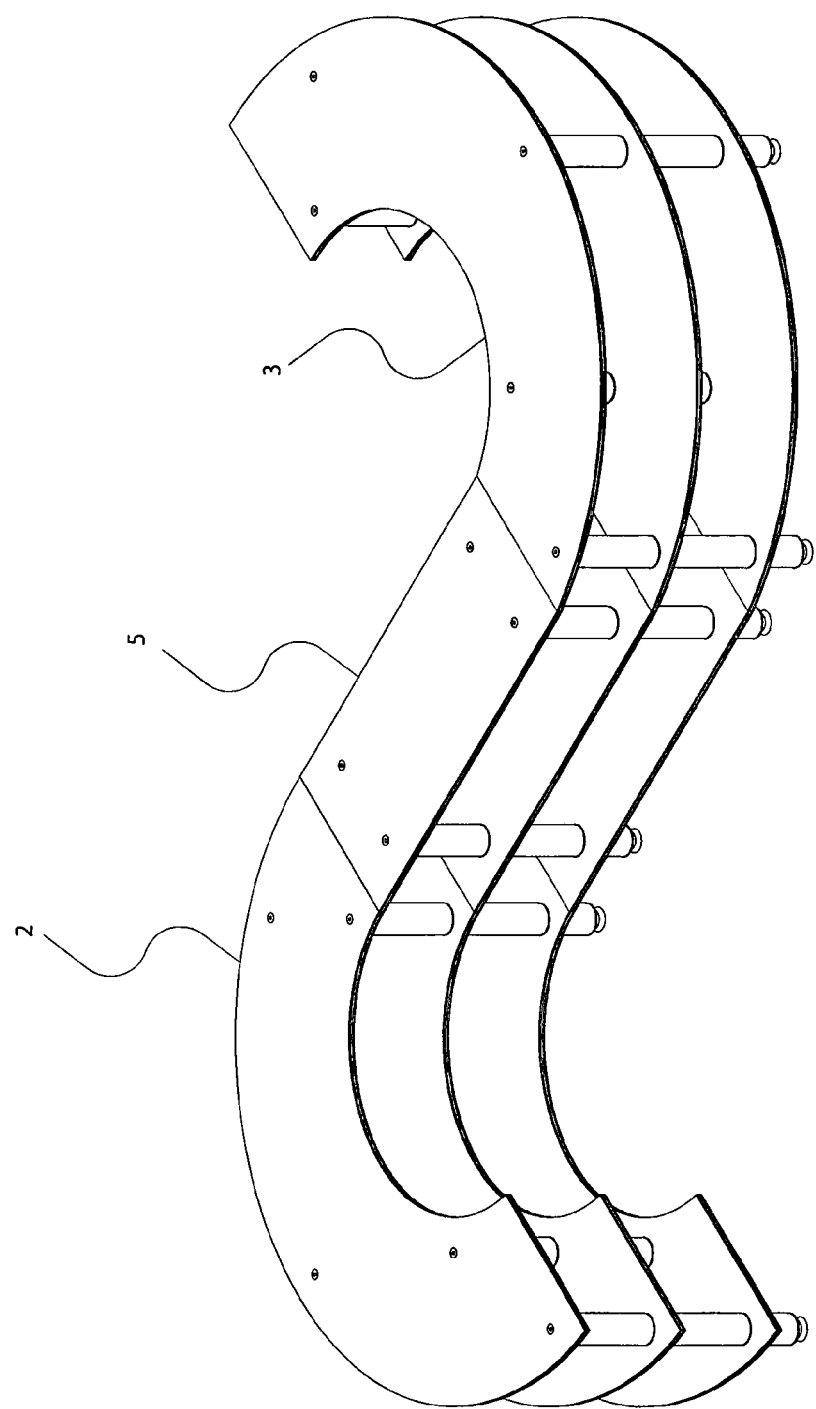
Figure 12:
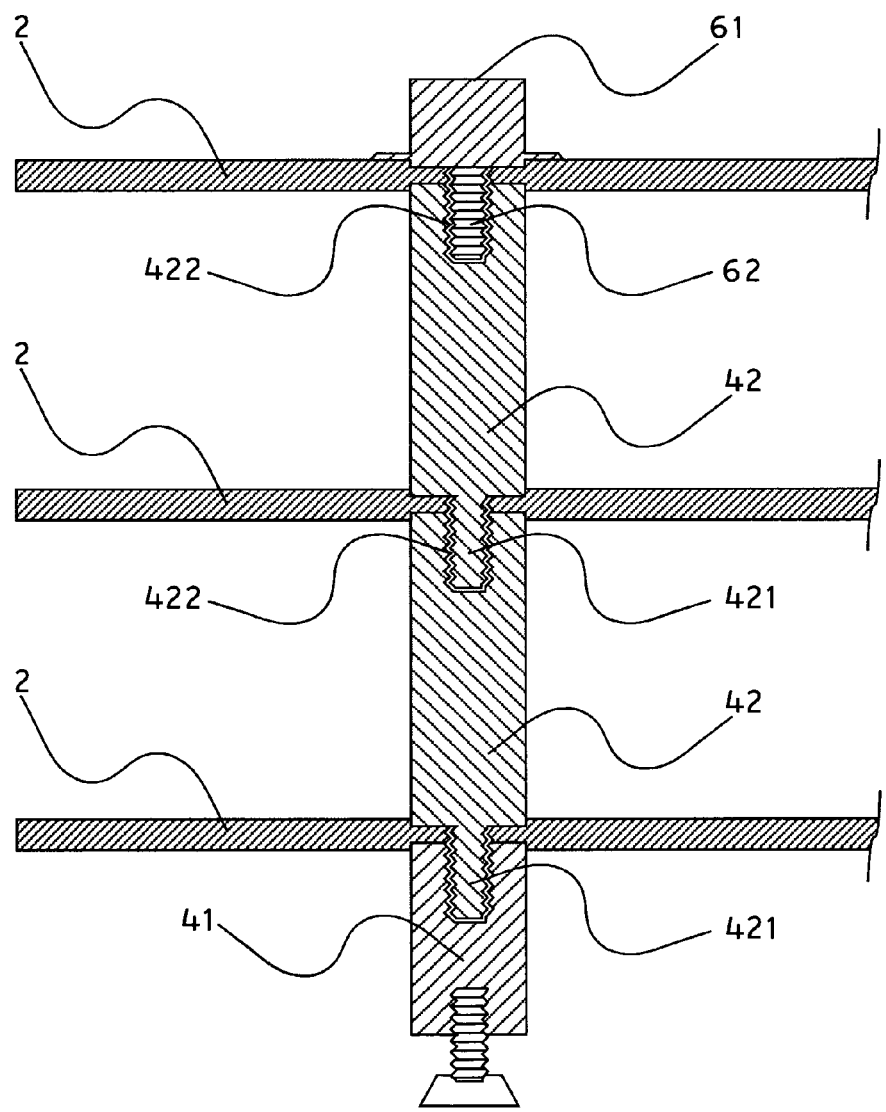
FIG. 12 illustrates in cross-section how three table surfaces (1) are connected by a leg (41), two support shafts (42) and one extension shaft (61).
Figure 13:
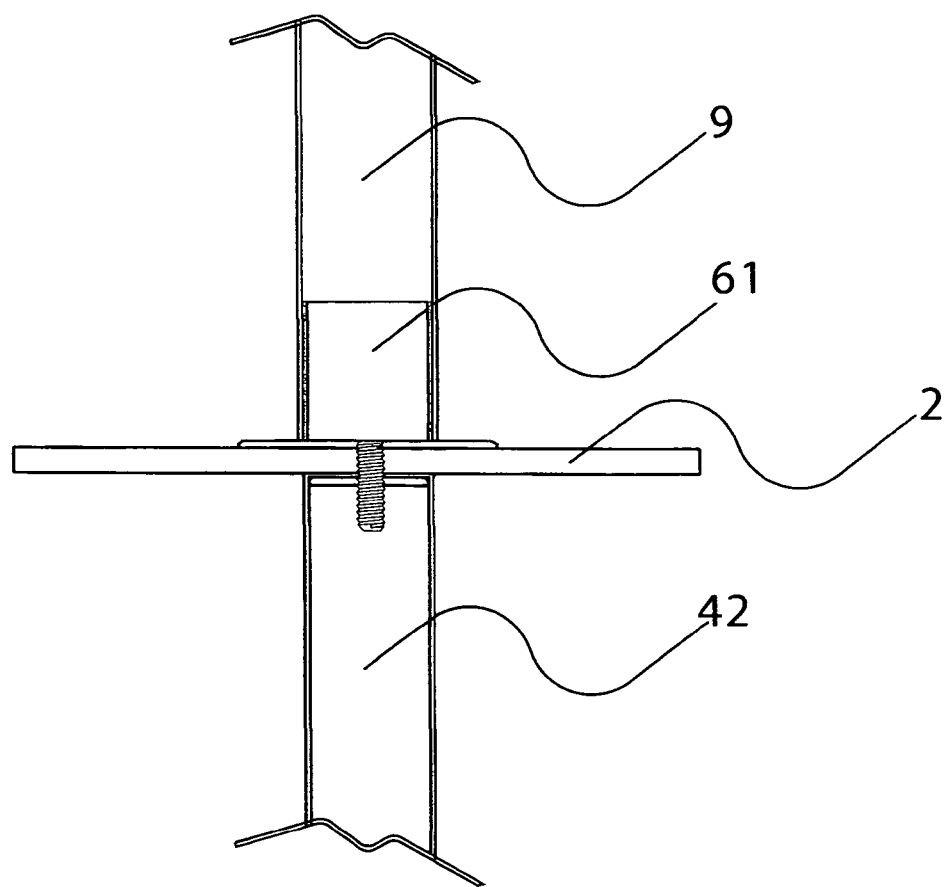
FIG. 13 presents the upper tier whereby a connector shaft (9) is inserted into the extension shaft (61).
Figure 14:
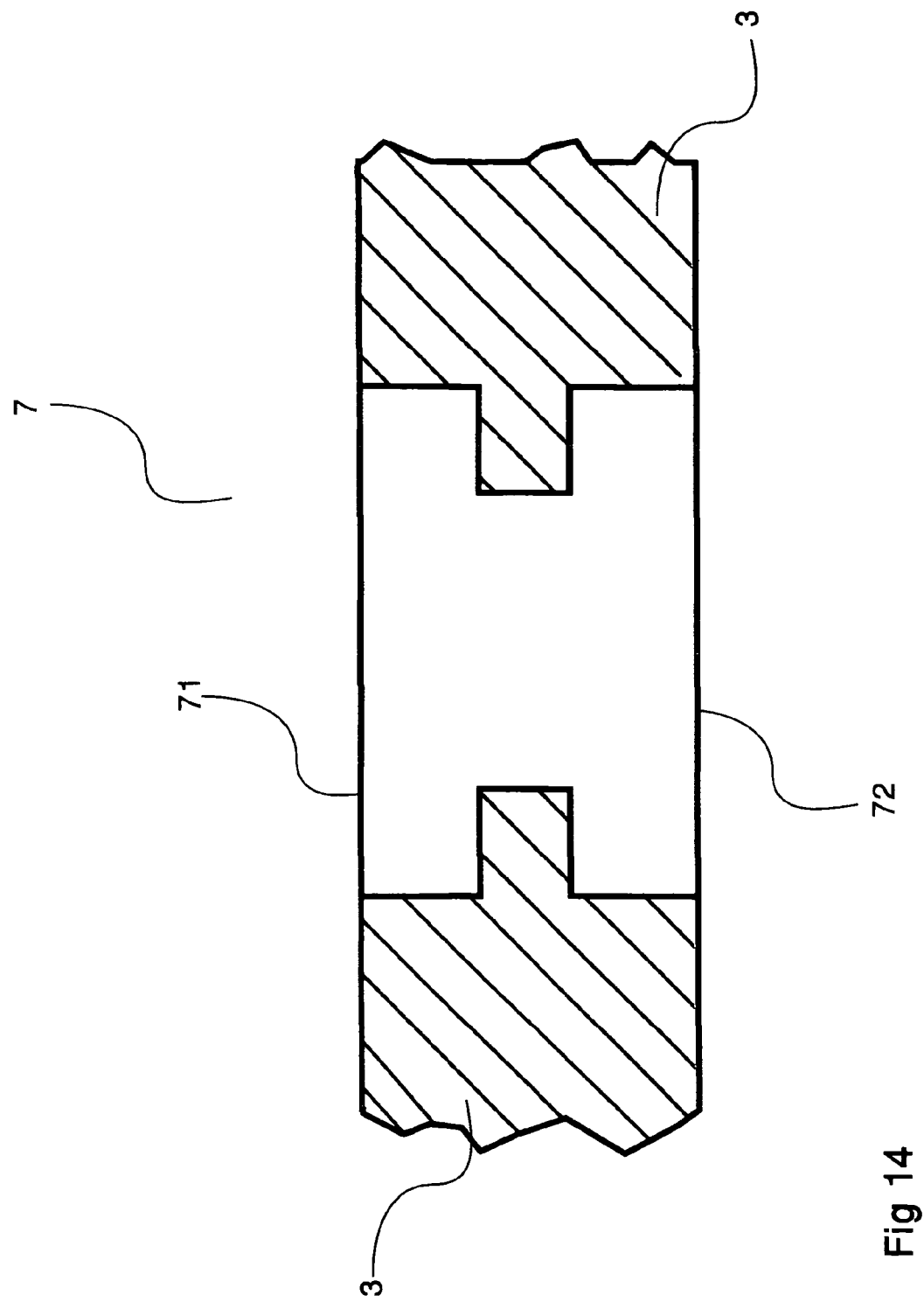
FIGS. 14 and 15 present two possible cross-sections of the holes (7) that are symmetrical relative to the holes' lateral axis.
Figure 15:
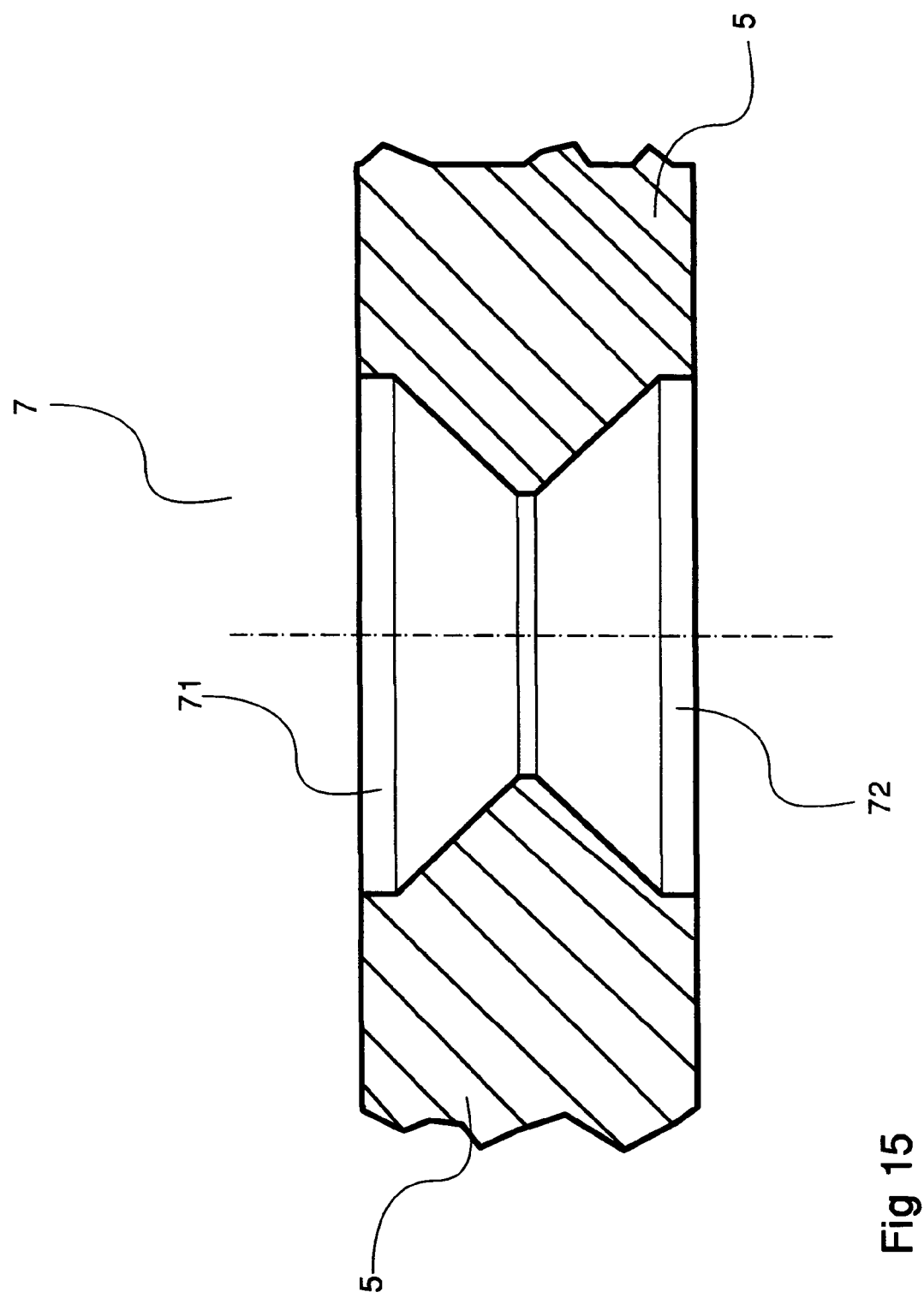
Figure 16:
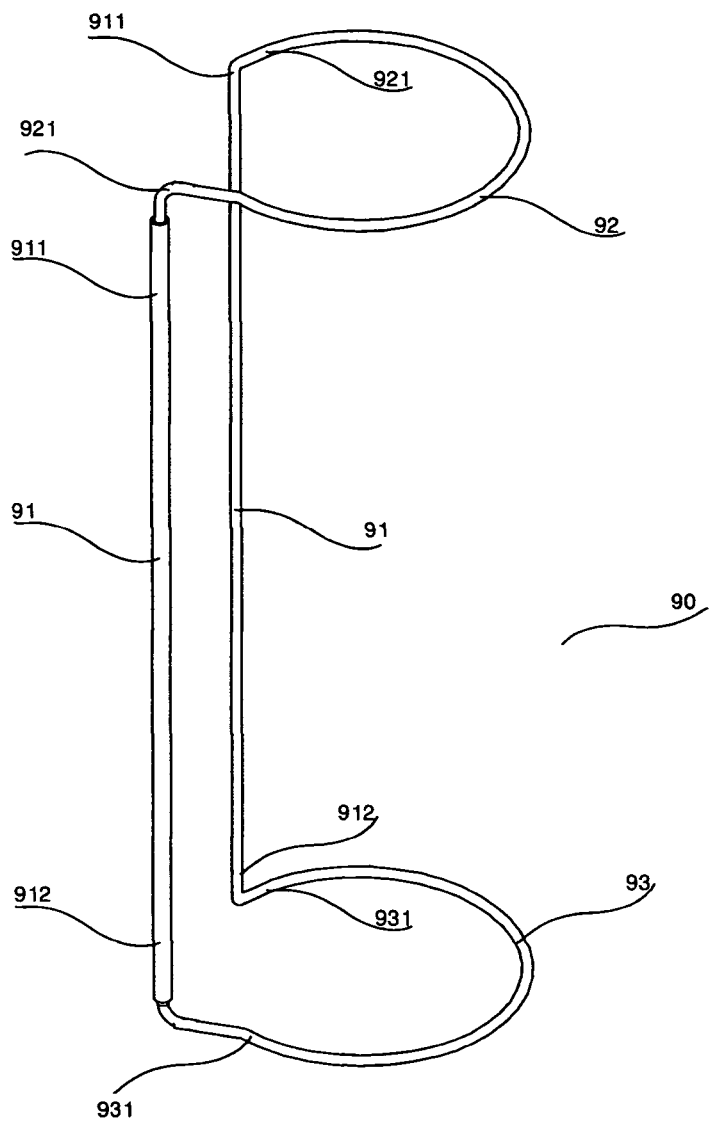
FIG. 16 depicts the spring (90).
Figure 17:
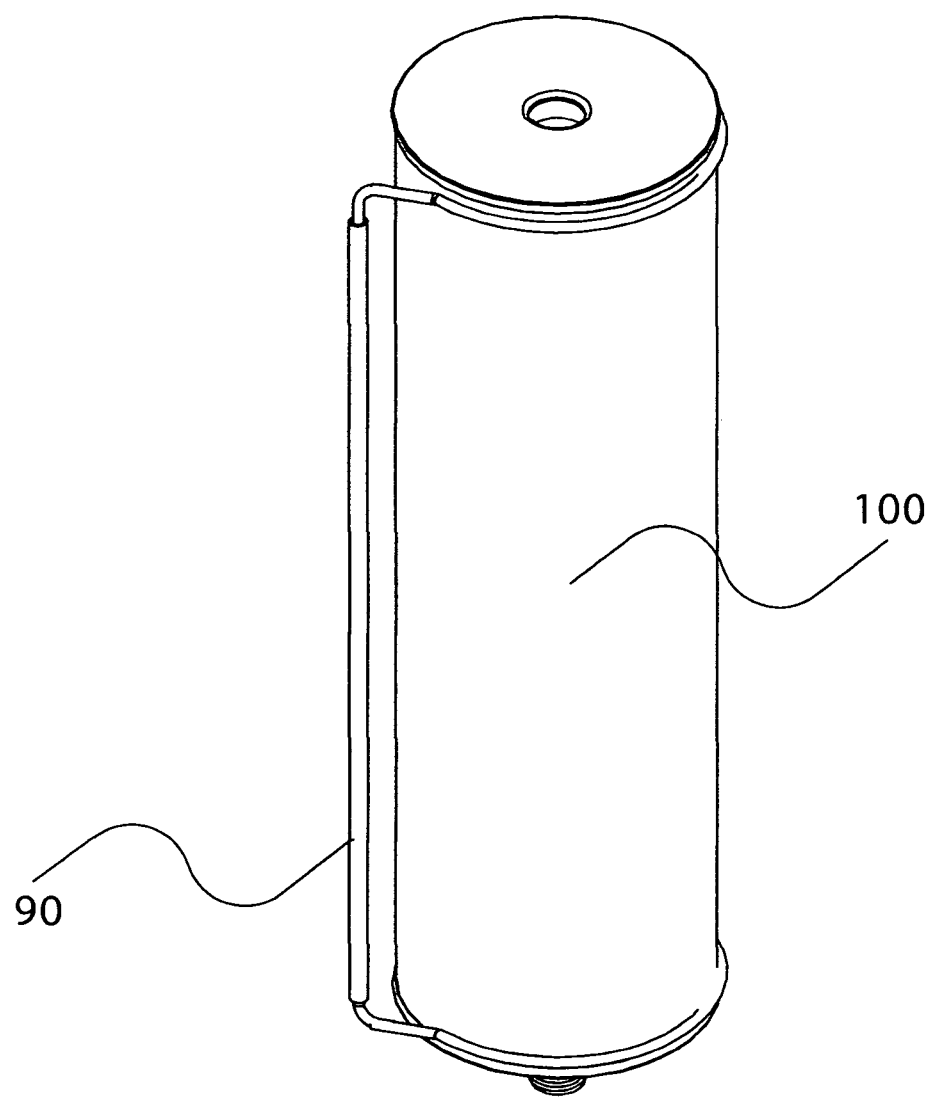
FIG. 17 depicts the spring (90) with a curtain (100) wrapped around it.
Figure 18:
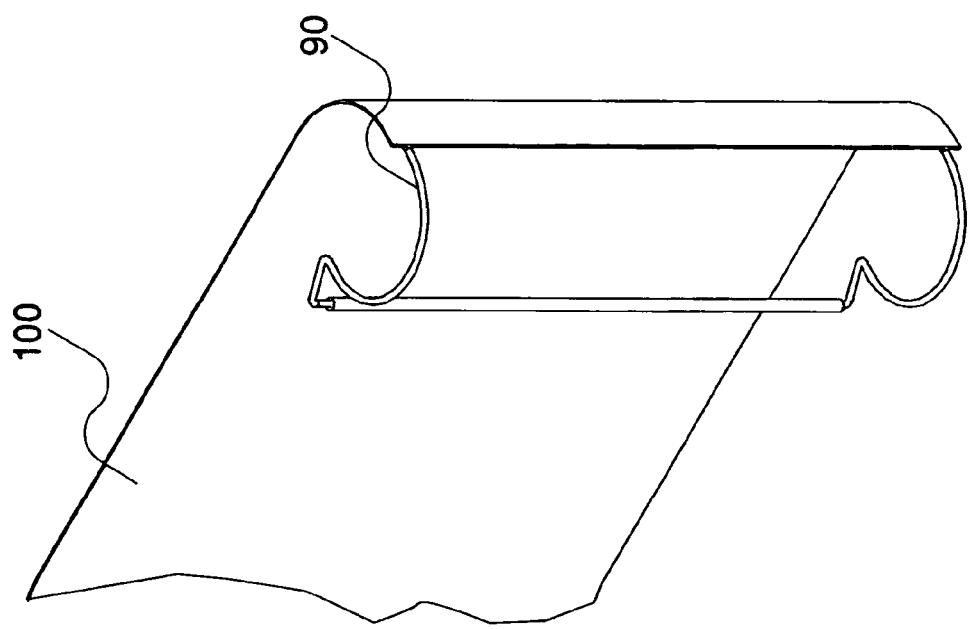
FIG. 18 depicts the curtain (100), whereby one end of the curtain (100) is attached to a spring (90) and the curtain is in open position.
Figure 19:
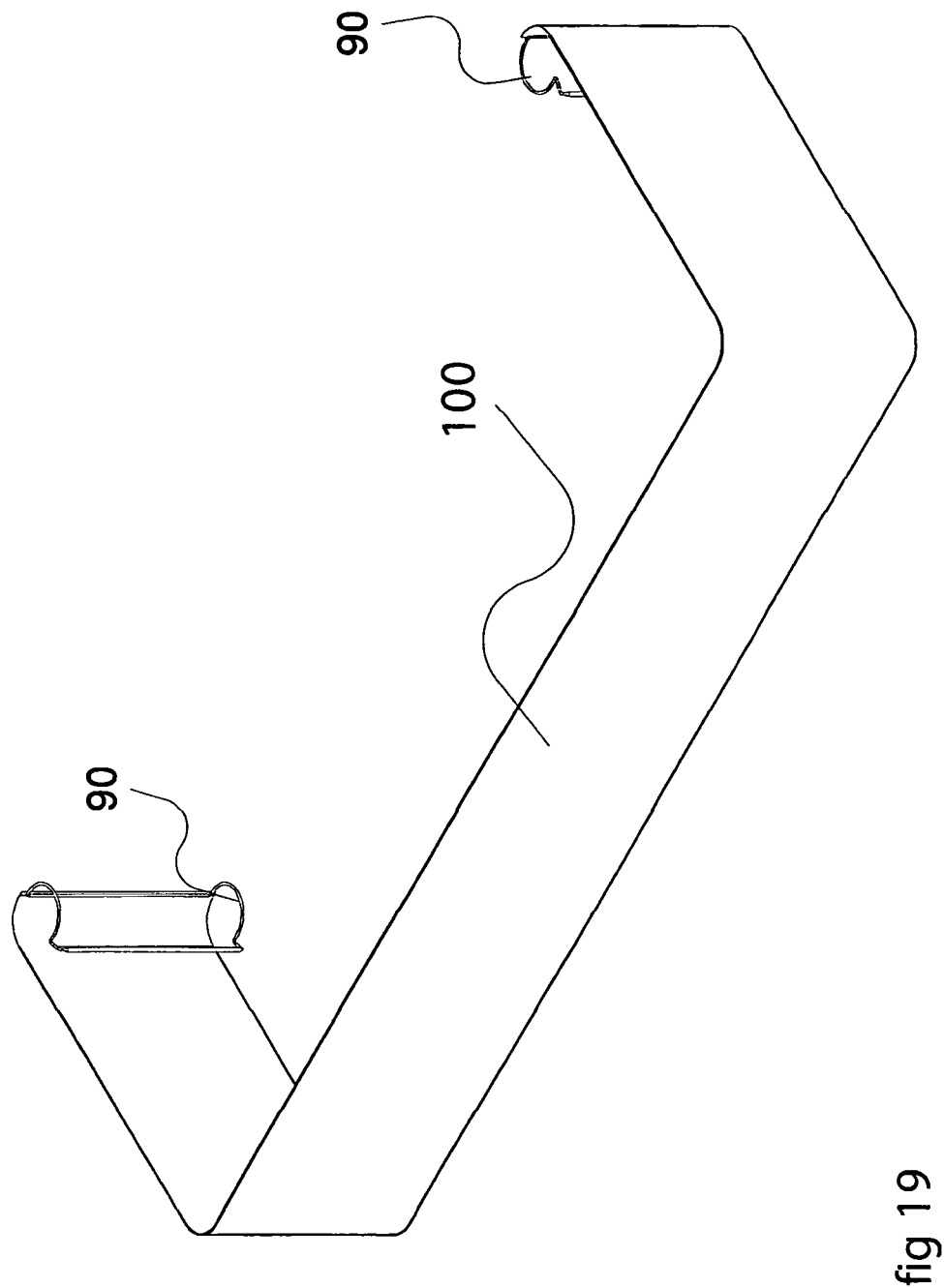
FIG. 19 depicts a curtain (100) in open position that is attached to a pair of springs (90) that are fit over legs (not shown in the drawing).
Figure 20:
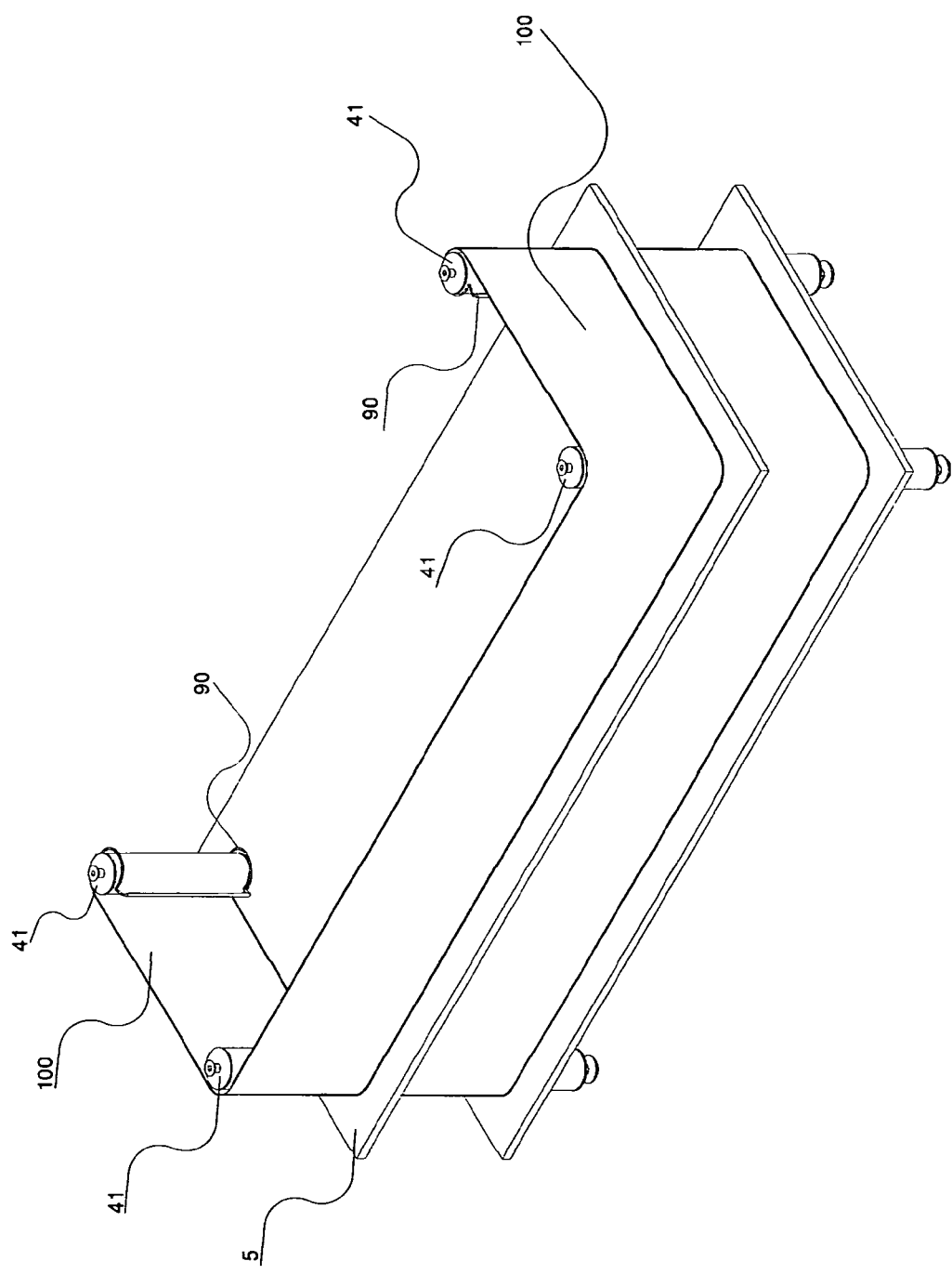
FIG. 20 depicts a two-tier rectangular table (5) whereby the space between the tiers is closed by a curtain (100).

The main objective of the present invention is to provide a ring-shaped serving table (1) that is made up of two identical or similar half-ring shaped plates (2) (3) that can be connected in one of two ways: (a) to form an almost complete ring, with a relatively large, round space in the middle and an entry into that space, as depicted in Drawing No. 1 and (b) to form an S-shaped table as depicted in Drawing No. 2.

A second objective of the present invention is to provide a ring-shaped serving table (1), as described above, that has two or more tiers, each of which comprise a plates (2) (3), as mentioned, that are assembled using a leg system (4). A third objective of the present invention is to provide a rectangular extension table (5) with a leg system (4) that is identical or similar to the leg system (4) used for the ring-shaped serving table (1). A fourth objective of the present invention is to provide an attaching system (6) designed to attach accessories to the ring-shaped serving table (1) and to the rectangular extension table (5).

In the first embodiment of the invention, the ring-shaped serving table (1) comprises two identical or similar half-ring shaped plates (2) (3) that when joined together to create an almost complete ring, with a relatively large space in the center and an entry into that space, form the shape described in Drawing No. 1. In order to explain the design of we will explain the final shape obtained when they are joined to form a ring, as mentioned above. It is clear from the description that these half-ring shaped plates (2) (3) are separable. But first, as shown in Drawing No. 2 it is clear that each of said half-ring shaped plates (2) (3) comprises: an outside arc (111), an inside arc (110) and two sides (X1) (X2).

Drawing No. 1 depicts the ring-shaped table (1) that is created when the flat sides of two half-ring shaped plates (2) (3) marked X1 are placed joined. The round space in the middle of the table (1) is intended as standing room for a waiter serving at the said table and the opening in the ring enables the waiter to access that space. The space in the middle of the ring-shaped table (1) is slightly elliptical and is not a perfect circle, such that the sides marked X2 are the same length as sides X1 and are parallel to them. This also enables the user to join the two half-ring shaped plates (2) (3) in the way depicted in Drawing No. 2 so that the interface and transition between the two plates is smooth and aesthetic.

Using the ring-shaped serving table (1) as described above offers a considerable advantage in that it may be efficiently and aesthetically assembled in two ways, as described above.

In the second embodiment of the invention, the ring-shaped table (1) comprises two or more identical or similar tiers, made up of the same plates (2) (3), which are assembled as depicted in Drawings Nos. 3 and 4. The plates (2) (3) are assembled using a leg system (4) that comprises a leg (41), a support shaft (42) and a top screw (43). The half-ring shaped plates (2) (3) in the second embodiment of the invention have several holes (7) that enable the user to assemble the said half-ring shaped plates using the leg system (4).

Components of the Leg System (4):

The leg (41) is a short shaft with a hole (411) in its upper end, which has an internal thread, as depicted in Drawing No. 5. The support shaft (42) is a shaft with a pin (421) protruding from its bottom end, which has an external thread, and a hole (422) in its upper end, which has an internal thread. The top screw (43) is a flat disc with a pin (431) protruding from its bottom end, which has an external thread, as depicted in Drawing No. 7.

The plates are assembled as follows to create the table (1), this description refers to half a table but is the same for the half: First, the pins (421) protruding from the bottom ends of the support shafts (42) are screwed, from above, into the holes (7) in the bottom plate (2), and the legs (41) are then screwed, from below, onto the pins (421) that protrude through the holes. Then, for a two-tier serving table (1), a second plate (2) is placed on the support shafts (42) that are already in place and the pins (431) protruding from the bottom of the top screws (43) are screwed, through the holes (7) in the second plate (2), into the holes (422) in the upper end of the support shafts (42). The two-tier serving table (1) is now assembled and ready for use, as depicted in Drawing No. 8. For a serving table (1) with three or more tiers, the process is repeated whereby the top screws (43) are used only to secure the top plate. Drawing No. 9 depicts a three-tier serving table (1).

Using the ring-shaped serving table (1) as described above offers a considerable advantage in that it can be stored without taking up too much space, it can be transported relatively easily, and it can be assembled quickly, efficiently and easily. Another advantage is the fact that the same identical plates (2) (3) are used for all tiers of the table (1) and the plates need not be matched according to their position in the table and the legs, support shafts and top screws are uniform and there is no need to mark them or match them to specific holes in the said plates.

The ring-shaped table in the third embodiment of the invention includes a leg system and rectangular plates that are assembled, as described above, to form a rectangular extension table (5) that may then be joined to the ring-shaped table (1). The short side X3 of the rectangular extension table (5) is identical in length to the sides X1 and X2 and so the rectangular table (5) can be used to extend the ring-shaped table (1) when it is assembled as an S-shaped table, as depicted in Drawings Nos. 10 and 11.

The fourth embodiment of the invention refers to a system for attaching accessories to the ring-shaped table (1) and the rectangular extension table (5). The attaching system (6) comprises an extension shaft (61) that is a relatively wide shaft that has a pin (62) with an external thread protruding from its bottom end. If the user wishes to place an accessory on the serving table (1) (5), then an extension shaft (61) is used instead of using a top screw (43), as depicted for instance in Drawing No. 12. The accessory can be a light fixture, a sign, an umbrella, a fume hood or any other accessory the user wished to hang or place above the serving table (1) (5). The accessory is attached to the top of the connector shaft (9), whose bottom part is hollow and fits over the extension shaft (61), as depicted for instance in Drawing No. 13. The fact that the accessory is attached to a connector shaft (9) that fits over the extension shaft (61), which is the direct continuation of the leg of the table (1), imparts stability and durability. The attaching system (6) is depicted in Drawing No. 6

Symmetrical Holes (7):

As mentioned, the ring-shaped table (1) and the rectangular table (5) have holes (7) through which the legs (41) are screwed on in the assembly of the tables, as described above. The holes (7) can and should be symmetrical relative to their lateral axis. In other words, the cross-section of the upper half (71) of each of the holes (7) is identical to the cross-section of the bottom half (72) of the said holes (7). Drawings Nos. 14 and 15 present two possible cross-sections of the holes (7) that are symmetrical relative to the holes' lateral axis.

If the holes (7) are designed so that only one side is intended to face up, the assembly of the tables (1) (5) will be restricted since the user would then have to pay attention that the correct side of the table plates are facing up during assembly, among other disadvantages. On the other hand, the fact that the holes (7) in the plates used to assemble the tables (1) (5) are symmetrical in terms of their lateral axes, enables either side of the said plates to face up when assembling the tables (1) (5). This offers several advantages, including the following: (a) The said plates may be manufactured so that one side is one color and the other side is another color, enabling the user to play with the colors while assembling the tables. (b) The assembly of the tables is easier and simpler since no attention must be paid to determining which side of each plate should face up and in fact each plate may be assembled in either position. In addition, when assembling the ring-shaped table (1) it makes no difference whether the plate is intended to be assembled on the left or right side. (c) If one side of the plate becomes damaged due to usage (scratching, scorch marks from hot cookware, etc.) the damaged plate may still be used such that the damaged side faces down.

Decorative Curtain with Pair of Springs for Tables:

Tables (1) (5) that are assembled as depicted for instance in Drawings Nos. 3, 4 and 11 have spaces between their tiers. These spaces can and should be closed using a decorative curtain with a pair of springs.

The spring (90) comprises two thin vertical rods (91) and two bows: a top bow (92) and a bottom bow (93). The two rods (91) are connected by the two bows (92) so that each of the upper ends (911) of the rods (91) is attached respectively to one of the two ends (921) of the top bow (92) and each of the bottom ends (912) of the rods (91) is attached respectively to one of the two ends (931) of the bottom bow (93).

The rods (91) can and should be the same length as the legs (41) so that the curtain that is attached to them closes the entire height of the space between the two tiers of the tables (1) (5). It is also recommended that the diameter of the bows (92) (93) be slightly smaller than the diameter of the legs (41) so that they fit over the legs (41) tightly. It is also recommended that the bows (92) (93) be made of a springy material so that they have a good grasp on the legs (41). Drawing No. 16 depicts the spring (90).

Drawing No. 17 depicts the spring (90) with a curtain (100) wrapped around it. The curtain (100) can and should be attached to two springs (90) such that one end of the curtain (100) is attached to one spring (90) and the other end of the curtain (100) is attached the other spring (90). Drawing No. 18 depicts the curtain (100), whereby one end of the curtain (100) is attached to a spring (90) and the curtain is in open position. Drawing No. 19 depicts a curtain (100) in open position that is attached to a pair of springs (90) that are fit over legs (not shown in the drawing). Drawing No. 20 depicts a two-tier rectangular table (5) whereby the space between the tiers is closed by a curtain (100).

What is claimed is:

1. A serving table (1) that comprises at least two separable identical half-ring shaped plates (2) (3) and a legs system (4); wherein each of said half-ring shaped plates comprises an outside arc (111), an inside arc (110) and two sides (X1) (X2); wherein said sides of said half-ring shaped plates are the same length; wherein the sides of each of said half-ring shaped plate are parallel to each other; wherein said legs system (4) includes at least four legs (41), four support shafts (42) and four top screws (43); wherein each of said legs comprises a short shaft with a hole (411) in its upper end that has an internal thread; wherein each of said support shafts (42) comprises a shaft with a pin (421) protruding from its bottom end that has an external thread, and a hole (422) in its upper end that has an internal thread; wherein each of said top screws (43) comprises a disc with a pin (431) protruding from its bottom end that has an external thread; whereby said half-ring shaped plates may be joined so as to form an almost complete ring-shaped table or an S-shaped table; whereby said half-ring shaped plates may be joined so as to form two or more tiers; wherein said half-ring shaped plates that make up said tiers are assembled using said leg system; wherein said half-ring shaped plates have several holes (7) through which said leg system (4) are screwed to assemble the serving table.

2. The serving table as claimed in claim 1 further includes an attaching system (6) for attaching accessories to said serving table; wherein said attaching system comprises an extension shaft (61) with a pin (62) protruding from its bottom end that has an external thread, and a connector shaft (9) that has a hollow bottom part and is designed to fit over said extension shaft (61); wherein said connector shaft is designed to hold an accessory and to enable users to place an accessory on said serving table; wherein said extension shaft (61) is used instead of said top screw (43) in relevant hole of the half-ring shaped plates.

\* \* \* \* \*